United States Patent

Kane

[15] 3,697,775

[45] Oct. 10, 1972

[54] THREE STATE OUTPUT LOGIC CIRCUIT WITH BISTABLE INPUTS

[72] Inventor: James F. Kane, San Jose, Calif.

[73] Assignee: Signetics Corporation, Sunnyvale, Calif.

[22] Filed: April 21, 1971

[21] Appl. No.: 136,031

[52] U.S. Cl. ..................307/209, 307/205, 307/247, 307/279

[51] Int. Cl. ........................H03k 19/08, H03k 17/18

[58] Field of Search..307/205, 209, 221 C, 251, 279, 307/247

[56] References Cited

UNITED STATES PATENTS

| | | | |
|---|---|---|---|
| 3,207,922 | 9/1965 | Gruodis et al. | 307/209 |
| 3,381,088 | 4/1968 | Lentz et al. | 307/209 X |
| 3,431,433 | 3/1969 | Ball et al. | 307/221 C |
| 3,492,496 | 1/1970 | Callan | 307/209 |

OTHER PUBLICATIONS

IBM Tech. Disclosure Bulletin " MOS Shift Reg. Element" by Short Vol. 9, No. 8 Jan. 1967, pp. 1047, 1048

*Primary Examiner*—John S. Heyman
*Attorney*—Flehr, Hohbach, Test, Albritton & Herbert

[57] ABSTRACT

A three output state logic circuit includes the last cell of a shift register, which is a flip-flop, coupled to an RS type flip-flop which drives a push-pull output circuit. The output circuit is placed in a high impedance or floating logic state by grounding the output terminals of the RS flip-flop. The effect of this grounding is, however, isolated from the last cell of the shift register so that it maintains its stored binary information.

6 Claims, 5 Drawing Figures

INVENTOR.
JAMES F. KANE

BY *Flehr, Hohbach, Test, Albritton & Herbert*
ATTORNEYS

THREE STATE OUTPUT LOGIC CIRCUIT WITH BISTABLE INPUTS

BACKGROUND OF THE INVENTION

The present invention is directed to a logic circuit having a three state output with bistable inputs.

In coupling such devices as static shift registers to a common buss, the connections cause either unwanted current paths or a reduction in response time. One solution as suggested in a copending application entitled "Three Output Level Logic Circuit," Ser. No. 816,662, filed Apr. 16, 1969, in the name of Edward M. Aoki, assigned to the present assignee and now U.S. Pat. No. 3,602,733 provides a logic circuit having a third high impedance output level in addition to the binary "0" and "1" levels. However, with the use of bistable devices such as shift registers care must be taken to ensure that the stored binary information is not destroyed when the circuit is placed in its third state.

OBJECTS AND SUMMARY OF THE INVENTION

It is, therefore, an object of the present invention to provide a logic circuit as above which provides three output states without destroying stored binary information.

In accordance with the above object, there is provided a logic circuit comprising first bistable means having first binary complementary outputs responsive to an input control signal to switch binary output states. Second bistable means have second binary complementary outputs. A pair of inputs are coupled to and responsive to a change of state in the first binary outputs to change the state of the second outputs. Push pull means are coupled to and driven by the second outputs for providing a binary output in accordance with the states of the second outputs. Means are coupled to the second bistable means for temporarily overriding the first outputs and for placing the second outputs in identical binary states. The push pull output means are responsive to the identical states where the output assumes a floating condition.

DETAILED DESCRIPTION OF THE PREFERRED EMBODIMENT

Figure 1:
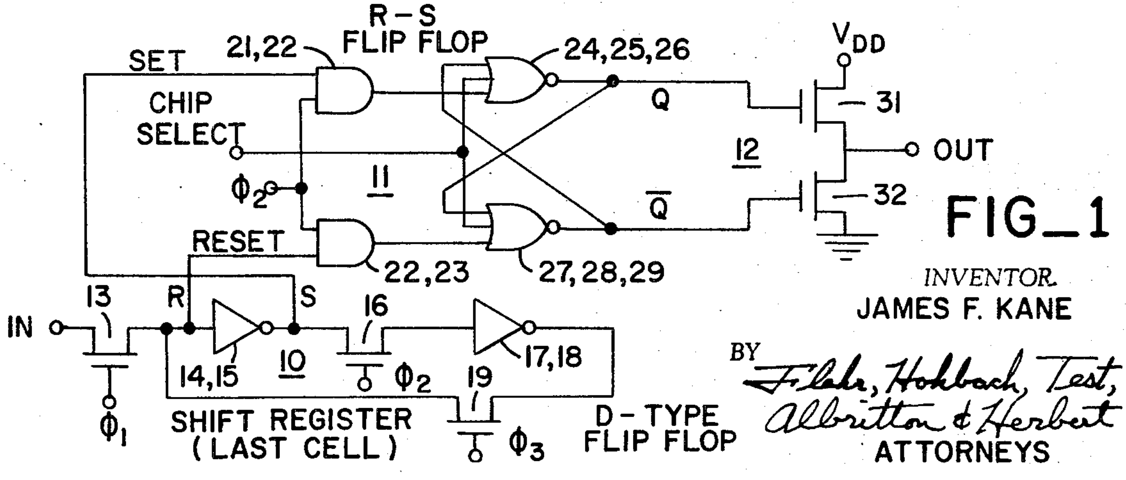
FIG. 1 is a block diagram embodying the present invention.

FIG. 1 is a block diagram of the logic circuit of the present invention which broadly includes a first bistable means 10 in the form of a D type flip-flop coupled to second bistable means 11 in the form of an RS type flip-flop which in turn is coupled to push pull output circuit 12 having a terminal designated "out". This terminal is normally coupled to a buss along with several other similar switching components.

Figures 2A, 2B, 2C:
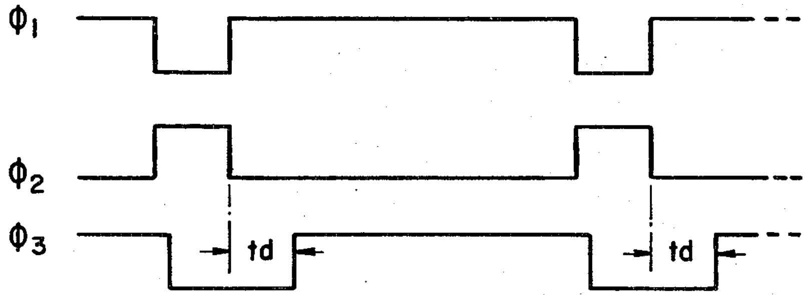
FIGS. 2A, 2B and 2C are timing diagrams useful in understanding the invention.

Flip-flop 10 in the preferred embodiment is the last cell in a shift register and its terminal labeled "in" extends to the other cells. More specifically, the flip-flop 10 includes a field effect transistor 13 coupling the input terminal to the input of an inverter 14, 15. The input of the inverter is also the reset terminal of flip-flop 11 and the output of the inverter is the set terminal. The gate input of field effect transistor (FET) 13 is a $\phi_1$ gating signal shown also in FIG. 2A.

The output of inverter 14, 15 is coupled through an FET 16 to the input of a second inverter 17, 18. The gate input of FET 16 is a gating signal $\phi_2$ shown in FIG. 2B. The output of inverter 17, 18 is coupled back to the input of inverter 14, 15 through FET 19 which has a gate signal $\phi_3$ shown in FIG. 2C.

Flip-flop 10 functions to store binary information inputed on the input terminal. The $\phi_1$ signal transfers information from the input terminal through FET 13 to inverter 14, 15. The output of inverter 14, 15 and the input data are complementary and this binary information is then coupled to the reset and set terminals or flip-flop 11. When $\phi_2$ goes low the binary information is transferred through FET 16 to inverter 17, 18 and after a suitable time delay, $t_d$, $\phi_3$ closes gate 19 to latch the flip-flop.

More specifically, the set and reset terminals of flip-flop 11 are one input of coincidence AND gates 21, 22, 22 and 23 respectively. The other inputs of the AND gates is the $\phi_2$ timing signal. The outputs of the AND gates are coupled respectively to NOR gates 24, 25, 26, and 27, 28, 29. These provide respectively Q and $\bar{Q}$ outputs which are coupled to FETs 31 and 32 which form the push pull components of push pull output circuit 12. One output terminal of FET 31 is coupled to $V_{dd}$ and an output terminal of FET 32 is coupled to ground; the remaining output terminals are commoned and provide the output terminal of the entire logic circuit.

The Q and $\bar{Q}$ outputs are cross coupled to the inputs of the NOR gates. The NOR gates also have as a third input a "chip select" input. This is activated with a "1" logic input. Logic "1" is a voltage more negative than the ground terminal. Both NOR gates are placed in a "0" state to cause both FETs 31 and 32 to be placed in an off condition. This places the output terminal in a floating or high impedance state. With the chip non-selected or at a "0" level, flip-flop 11 operates in the normal manner with complementary outputs Q and $\bar{Q}$ changing state and causing the output terminal to shift between $V_{dd}$ and ground depending on the binary information on the set and reset terminals of flip-flop 11.

However, activation of the chip select terminal temporarily overrides the effect of a "0" output on one of the AND gates 21, 22 or 22, 23 to place both the Q and $\bar{Q}$ output lines in the identical binary states of "0" to produce the third output state discussed above.

Figure 3:
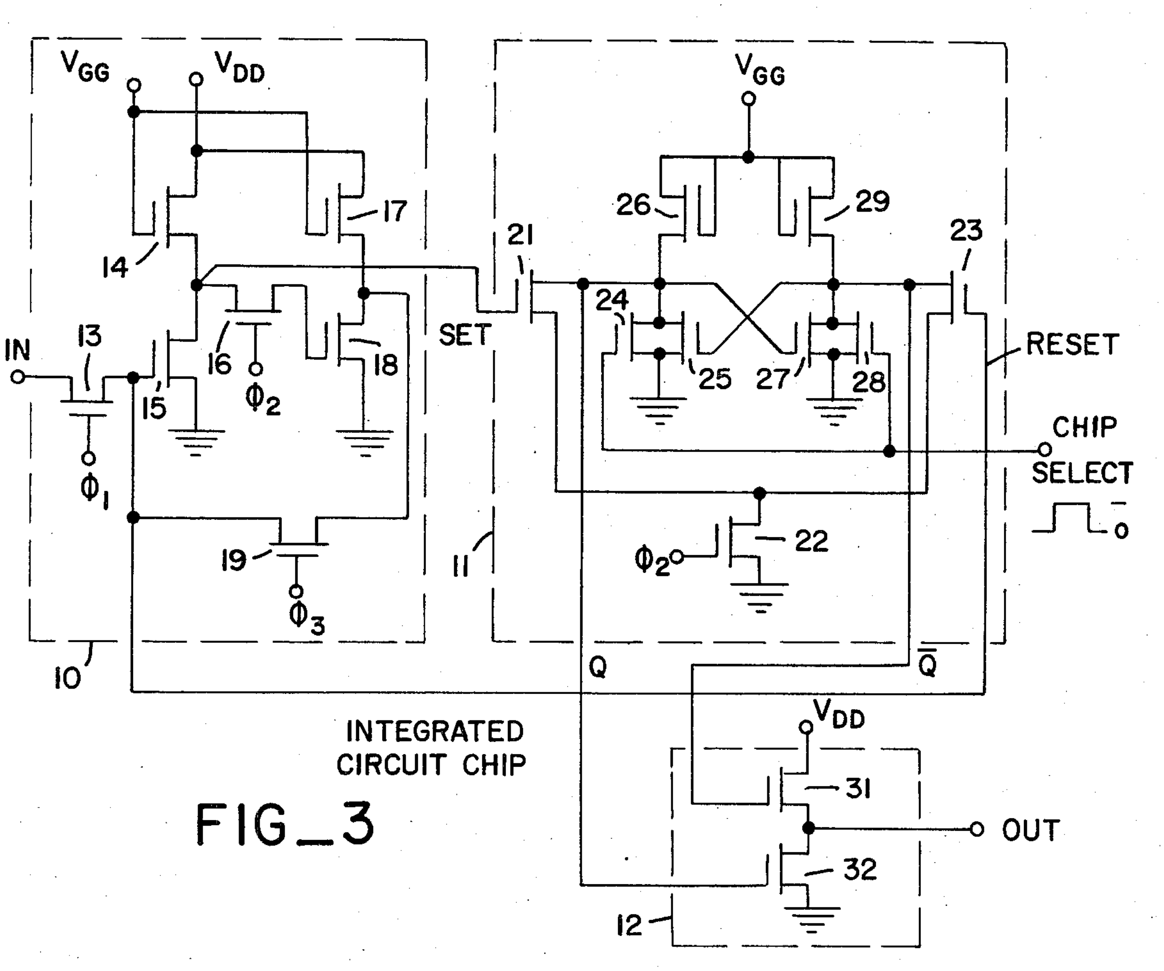
FIG. 3 is a detailed schematic circuit of FIG. 1.

FIG. 3 illustrates the detailed circuitry with the dashed blocks 10, 11 and 12 corresponding to those basic components of FIG. 1. All of the transistor components are field effect transistors and have reference numbers corresponding to those on the blocks of FIG. 1. All of the dashed blocks are placed on a common integrated circuit chip along with the clock generator for the $\phi_1$, $\phi_2$ and $\phi_3$ timing clocks (not shown).

The "chip select" input performs its function by placing a ground, by means of field effect transistors 24 and 28 on the Q and $\bar{Q}$ output lines of flip-flop 11. When the chip select terminal is returned to ground, push pull output circuit 12 immediately returns to its proper state. The foregoing ground is isolated from the set and reset lines to the flip-flop by means of field effect transistors 21 and 23 which as illustrated in FIG. 2 form a portion of the AND gates. Because of this isolation, the binary state of flip-flop 10 remains unaffected since a negligible current drains from the reset and set outputs of inverter 14, 15 due to the high gate impedance of FETs 21 and 23.

Thus, in accordance with the invention a three state level logic circuit has been provided wherein its third or high impedance state binary information which has been stored in a bistable means is not destroyed.

I claim:

1. A logic circuit comprising: first bistable means having first binary complementary outputs and responsive to an input control signal to switch binary output states; second bistable means having second binary complementary outputs and a pair of inputs coupled to and responsive to a change of state in said first binary outputs to change the states of said second outputs; push pull output means coupled to and driven by said second outputs for providing a binary output in accordance with the states of said second outputs; and means coupled to said second bistable means for temporarily overriding said first outputs and for placing said second outputs in identical binary states, said push pull output means being responsive to said identical states where its output assumes a third floating condition different from said binary output of said push pull means.

2. A logic circuit as in claim 1 where said second bistable means includes a pair of field effect transistors having input gates coupled to said first outputs whereby said first bistable means is isolated from the effects of said means for placing said second outputs in identical binary states.

3. A logic circuit as in claim 1 where all of the transistor components of the circuit are field effect transistors.

4. A logic circuit as in claim 1 where said first bistable means is the last cell of a shift register.

5. A logic circuit as in claim 1 where said pair of inputs of said second bistable means have a high impedance and drain negligible current from said first outputs.

6. A logic circuit as in claim 1 where said means for placing said second outputs in identical binary states includes a pair of field effect transistors for selectively concurrently grounding such outputs.

* * * * *